(12) United States Patent
Gautam et al.

(10) Patent No.: US 11,263,499 B2
(45) Date of Patent: *Mar. 1, 2022

(54) MULTI-PERSPECTIVE DETECTION OF OBJECTS

(71) Applicant: Rapiscan Laboratories, Inc., Fremont, CA (US)

(72) Inventors: Simanta Gautam, Charlottesville, VA (US); Brian Shimanuki, Pleasanton, CA (US); Bruno Brasil Ferrari Faviero, San Francisco, CA (US); Brian Xie, Fremont, CA (US)

(73) Assignee: Rapiscan Laboratories, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,538

(22) Filed: May 20, 2020

(65) Prior Publication Data

US 2020/0334494 A1 Oct. 22, 2020

Related U.S. Application Data

(63) Continuation of application No. 16/658,934, filed on Oct. 21, 2019, now Pat. No. 10,706,335, which is a
(Continued)

(51) Int. Cl.
*G06K 9/00* (2006.01)
*G06K 9/62* (2022.01)
*G06N 3/02* (2006.01)

(52) U.S. Cl.
CPC ......... *G06K 9/629* (2013.01); *G06K 9/00624* (2013.01); *G06K 9/6232* (2013.01); *G06N 3/02* (2013.01); *G06K 9/6277* (2013.01)

(58) Field of Classification Search
CPC .. G06K 9/629; G06K 9/6232; G06K 9/00624; G06K 9/6277; G06N 3/02
(Continued)

(56) References Cited

U.S. PATENT DOCUMENTS 5,600,303 A 2/1997 Husseiny
6,128,365 A 10/2000 Bechwati
(Continued)

FOREIGN PATENT DOCUMENTS

CA 2651131 11/2007
CA 2796809 10/2011
(Continued)

OTHER PUBLICATIONS

He et al. "Mask R-CNN," Facebook AI Research (FAIR) Apr. 5, 2017, 10 pages.
(Continued)

*Primary Examiner* — Van D Huynh
(74) *Attorney, Agent, or Firm* — Novel IP

(57) ABSTRACT

Technology disclosed herein may involve a computing system that (i) generates (a) a first feature map based on a first visual input from a first perspective of a scene utilizing at least one first neural network and (b) a second feature map based on a second visual input from a second, different perspective of the scene utilizing at least one second neural network, where the first perspective and the second perspective share a common dimension, (ii) based on the first feature map and a portion of the second feature map corresponding to the common dimension, generates cross-referenced data for the first visual input, (iii) based on the second feature map and a portion of the first feature map corresponding to the common dimension, generates cross-refer-
(Continued)

enced data for the second visual input, and (iv) based on the cross-referenced data, performs object detection on the scene.

20 Claims, 11 Drawing Sheets

Related U.S. Application Data continuation of application No. 16/189,300, filed on Nov. 13, 2018, now Pat. No. 10,452,959.

(60) Provisional application No. 62/701,365, filed on Jul. 20, 2018.

(58) Field of Classification Search
USPC .......................................................... 382/103
See application file for complete search history.

(56) References Cited

U.S. PATENT DOCUMENTS

| | | | |
|---|---|---|---|
| H2110 H | | 10/2004 | Newman |
| 6,825,854 B1 | | 11/2004 | Beneke |
| 7,277,577 B2 | | 10/2007 | Ying |
| 7,702,068 B2 | | 4/2010 | Scheinman |
| 8,009,864 B2 * | | 8/2011 | Linaker .............. G06K 9/00664 |
| | | | 382/103 |
| 8,014,493 B2 | | 9/2011 | Roux |
| 8,494,210 B2 | | 7/2013 | Gudmundson |
| 8,633,823 B2 | | 1/2014 | Armistead, Jr. |
| 8,693,731 B2 * | | 4/2014 | Holz .................. G06K 9/00375 |
| | | | 382/103 |
| 8,875,226 B1 | | 10/2014 | Marek |
| 9,042,511 B2 | | 5/2015 | Peschmann |
| 9,042,661 B2 | | 5/2015 | Pavlovich |
| 9,170,212 B2 | | 10/2015 | Bouchard |
| 2002/0159627 A1 | | 10/2002 | Schneiderman |
| 2004/0066966 A1 | | 4/2004 | Schneiderman |
| 2006/0088207 A1 | | 4/2006 | Schneiderman |
| 2006/0197523 A1 | | 9/2006 | Palecki |
| 2007/0112556 A1 | | 5/2007 | Lavi |
| 2008/0008353 A1 * | | 1/2008 | Park ......................... G06K 9/32 |
| | | | 382/103 |
| 2008/0063140 A1 | | 3/2008 | Awad |
| 2008/0170660 A1 | | 7/2008 | Gudmundson |
| 2008/0283761 A1 | | 11/2008 | Robinson |
| 2010/0046704 A1 | | 2/2010 | Song |
| 2012/0293633 A1 * | | 11/2012 | Yamato .................. G06T 7/593 |
| | | | 348/47 |
| 2012/0304085 A1 | | 11/2012 | Kim |
| 2013/0163811 A1 | | 6/2013 | Oelke |
| 2013/0215264 A1 | | 8/2013 | Soatto |
| 2013/0294574 A1 | | 11/2013 | Peschmann |
| 2013/0322742 A1 | | 12/2013 | Walton |
| 2014/0344533 A1 | | 11/2014 | Liu |
| 2016/0098620 A1 | | 4/2016 | Geile |
| 2016/0117898 A1 | | 4/2016 | Kuznetsov |
| 2016/0216398 A1 | | 7/2016 | Bendahan |
| 2016/0232689 A1 | | 8/2016 | Morton |
| 2017/0061625 A1 | | 3/2017 | Estrada |
| 2017/0083792 A1 | | 3/2017 | Rodríguez-Serrano |
| 2017/0116511 A1 | | 4/2017 | Kim |
| 2017/0263019 A1 * | | 9/2017 | Song .................... G06K 9/4671 |
| 2017/0278300 A1 | | 9/2017 | Hurter |
| 2017/0316285 A1 | | 11/2017 | Ahmed |
| 2017/0350834 A1 | | 12/2017 | Prado |
| 2018/0089816 A1 * | | 3/2018 | Potter ................ G06K 9/00791 |
| 2018/0150713 A1 | | 5/2018 | Farooqi |
| 2018/0351634 A1 | | 12/2018 | Ryan |

FOREIGN PATENT DOCUMENTS

| | | |
|---|---|---|
| JP | H04103997 | 4/1992 |
| JP | 3103997 A | 11/1992 |
| JP | 2010520542 A | 6/2010 |
| WO | 2006119603 | 11/2006 |
| WO | 2008107112 | 9/2008 |
| WO | 2010050952 | 5/2010 |

OTHER PUBLICATIONS

He et al. "Deep Residual Learning for Image Recognition," Microsoft Research Dec. 10, 2015, 12 pages.
Steitz et al. "Multi-view X-ray R-CNN," Department of Computer Science, TU Darmstadt, Darmstadt, Germany, Oct. 4, 2018, 16 pages.
Girshick et al. "Rich feature hierarchies for accurate object detection and semantic segmentation," Tech report (v5), UC Berkeley, Oct. 22, 2014, 21 pages.
Girshick, Ross "Fast R-CNN," Microsoft Research, Sep. 27, 2015, 9 pages.
Krizhevsky et al. "ImageNet Classification with Deep Convolutional Neural Networks," 9 pages, /2012/.
Liu et al. "SSD: Single Shot MultiBox Detector," Dec. 29, 2016, 17 pages.
Lin et al. "Focal Loss for Dense Object Detection," Facebook AI Research (FAIR), Feb. 7, 2018, 10 pages.
Lin et al. "Microsoft COCO: Common Objects in Context," Feb. 21, 2015, 15 pages.
Lin et al. "Feature Pyramid Networks for Object Detection," Facebook AI Research (FAIR), Cornell University and Cornell Tech, Apr. 19, 2017, 10 pages.
Lin et al. "Cross-View Image Geolocalization," University of California, Brown University, 8 pages, 2013.
Redmon et al. "You Only Look Once: Unified, Real-Time Object Detection," 10 pages, /2016/.
Ren et al. "Faster R-CNN: Towards Real-Time Object Detection with Region Proposal Networks," Jan. 6, 2016, 14 pages.
Simonyan et al. "Very Deep Convolutional Networks for Large-Scale Image Recognition," Visual Geometry Group, Department of Engineering Science, University of Oxford, Apr. 10, 2015, 14 pages.
Akcay, et al., "Transfer Learning Using Convolutional Neural Networks for Object Classification Within X-Ray Baggage Security Imagery," IEE International Conference on Image Processing (ICIP), Sep. 25, 2016, pp. 1057-1061.
European Patent Office, European Extended Search Report dated Nov. 27, 2018, issued in connection with European Patent Application No. 18183573.7, 11 pages.
Salvador et al. ("Faster R-CNN Features for Instance Search," IEEE Conference on Computer Vision and Pattern Recognition Workshops (CVPRW), Jun. 26-Jul. 1, 2016) (Year: 2016).

* cited by examiner

MULTI-PERSPECTIVE DETECTION OF OBJECTS

CROSS REFERENCE TO RELATED APPLICATIONS

This application claims priority to and is a continuation of U.S. Non-Provisional patent application Ser. No. 16/658,934, filed Oct. 21, 2019 and entitled "Multi-Perspective Detection of Objects", which is a continuation of U.S. Non-Provisional patent application Ser. No. 16/189,300, filed on Nov. 13, 2018, entitled "Multi-Perspective Detection of Objects", and issued as U.S. Pat. No. 10,452,959 on Oct. 22, 2019, which in turn claims priority to U.S. Provisional Patent App. No. 62/701,365, filed on Jul. 20, 2018 and entitled "Perspective Fusion for Multi-View Object Detection." The respective contents of each of these patent filings are herein incorporated by reference in its entirety.

FIELD OF THE DISCLOSURE

The disclosure is generally related to the computational field of visual search.

BACKGROUND

The computational field of visual search involves the task of processing an image or other visual input, to identify a given object within that image. Visual search has many applicable fields, just a few of which may include: security screening, facial recognition, optical character recognition, etc.

One of ordinary skill in the art will appreciate these as well as numerous other aspects in reading the following disclosure.

BRIEF DESCRIPTION OF THE DRAWINGS

Please note that this patent or application file contains at least one drawing executed in color. Copies of this patent or patent application publication with color drawing(s) will be provided by the Office upon request and payment of the necessary fee.

Features, aspects, and advantages of the presently disclosed technology may be better understood with respect to the following description, appended claims, and accompanying drawings where:

Figure 1:
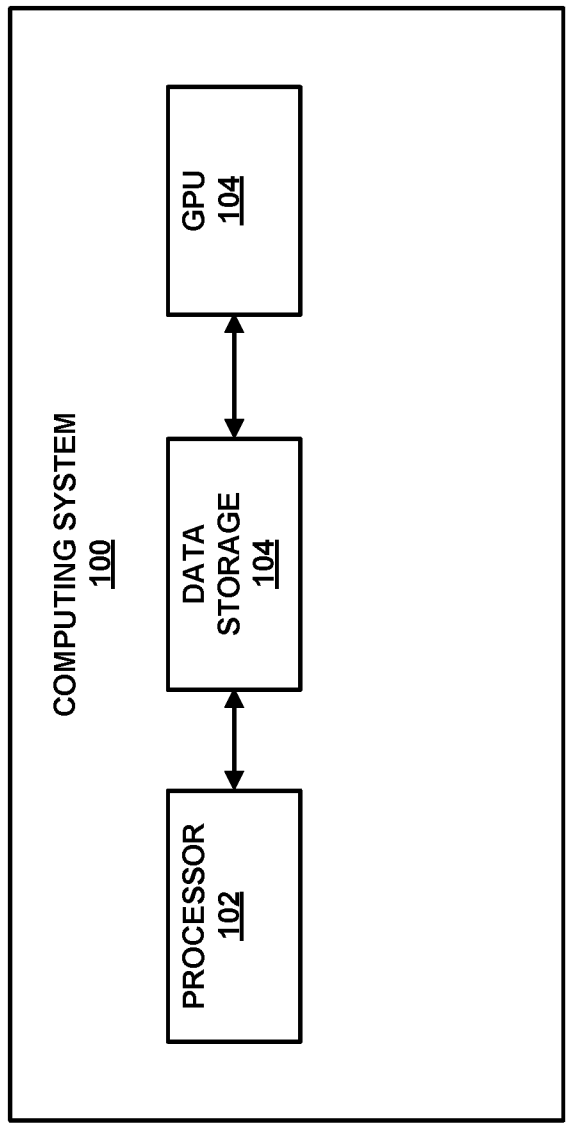
FIG. 1 is a conceptual diagram illustrating a diagram illustrating an example computing device that may be configured to train and execute an object detector.

The drawings are for illustrating example embodiments, and the inventions are not limited to the arrangements and instrumentality shown in the drawings.

DETAILED DESCRIPTION

I. Overview

The process of performing visual search may take various forms. At a high level, visual search may involve identifying various items by performing a visual inspection of a scene to identify one or more objects within that scene.

At a high level, a scene may comprise one or more perspectives, and each perspective may comprise one or more images captured from each perspective. As an example, a scene may comprise an area of which images are captured by one or more cameras. As another example, a scene may comprise a 3D space that is scanned by a CT scanner or an X-Ray scanner. A scene may take various other forms as well.

Each scene may comprise one or more different perspectives. A perspective may take various forms. At a high level, each perspective may comprise a different orientation of the scene. For instance, one perspective may be from an x-y orientation of the scene and another perspective may be from a y-z orientation of the scene, which in this example may be orthogonal perspectives. While described as being orthogonal for the purpose of example, perspectives that make up a scene need not be orthogonal. For example, two different perspectives may be offset by a given number of degrees within the scene (e.g. 30 degrees, 45 degrees, etc.). It should further be understood that while two perspectives are described for the purpose of example, a scene may comprise any number of perspectives and similarly that the techniques of this disclosure may be applicable to any number of perspectives.

According to some implementations, a perspective may comprise volumetric data. For example, an x-y perspective of a scene may comprise a 3D volume which may be represented in various manners. According to some implementation, a 3D volume may be composed of voxels or polygons in a 3D space. According to another implementation, a 3D volume that makes up a perspective may take the form of a series of "slices," which may represent or depict the perspective from different given levels of depth. A slice may comprise pixels, voxels, polygons, or other representations of the slice, as some examples. These slices may be ordered based on their depth according to some examples. A perspective may take various other forms as well.

A scene may vary in its contents, which may take various forms. In some cases, a scene may comprise a plurality of objects. For instance, a scene may comprise an image of a storage bin (e.g., used in a security screening context) that may include various objects that are enclosed by the bin, such as a watch, wallet, belt, shoes, etc. In another example, a scene may comprise a single object, such as a depiction of a passenger, package, garment, piece of luggage, etc., which may in turn contain one or more additional items. For the purposes of this disclosure, an object may refer to an object that is present within a scene and may also refer to items (i.e., objects) which are contained within or are inside at least one dimension of, or are otherwise associated with, an object. An object may take various other forms as well.

The process of identifying objects within a given scene may also take various forms and may also be utilized in the context of security screening. At a high level, security screening may involve (1) using humans to analyze images of a scene to identify objects within the scene, referred to herein as "human identification" and/or (2) using computing devices to perform the process of detecting and identifying objects within a scene, which is referred to herein as "object detection."

According to a human identification implementation, humans, such as security screeners, may perform visual inspection of images of a scene to identify various objects in the scene. The process of using humans to perform visual inspection involves the security screeners analyzing detection images of the scene captured by one or more detection devices that are in turn displayed to the security screeners for the purpose of enabling the security screeners to identify objects within the scene. Human identification security screening may take various other forms as well.

Recently and increasingly, computing devices may be used to automate the task of visual search. At a high level, visual search as performed by a computing device involves identifying the positions of more objects (a process referred to as "localization") that are present in a digital image, and determining a respective class to which each object belongs, referred to as "classification." The combination of performing localization and classification refers generally to an overarching process referred to as "object detection."

A variety of classes of machine learning techniques may be used to perform the functions involved in object detection. At a high level, machine learning involves using statistical techniques to allow computing systems to progressively improve performance when performing a specific task. Within the class of machine learning techniques, so-called "deep learning" techniques, which allow a computing system configured to perform machine learning techniques to automatically discover the representations needed for feature detection or classification from raw data may be particularly well suited to the task of object detection.

Within the class of deep learning techniques, certain deep learning architectures, such as deep neural network-based architectures, may be well-suited to performing object detection. At a high level, deep neural net-based architectures configured to perform object detection may take an input, such as a digital image, pass the image through a series of interconnected layers each of which performs a mathematical manipulation on its input data and outputs the manipulated data to another layer of the deep neural net before finally outputting locations and classes of any identified items detected from the input image.

One implementation of note, designed by Synapse Technologies, and described in U.S. Pat. No. 9,996,890 and U.S. patent application Ser. No. 15/800,609, titled "Detection of Items," filed on Nov. 1, 2017, is capable of identifying various classes of items from one or more depictions of a scene. Various other machine learning and deep techniques may be used to perform object detection as part of performing a security screening as well.

Ideally, a computerized object detection system would be able to analyze images from multiple perspectives by cross-referencing the images from different perspectives in a set of multi-perspective images of a scene to better detect and identify objects as compared to analyzing only a set of single perspective of that scene.

While a human, such as a security screener, may be capable of analyzing the images from each view in the set of multi-perspective images to determine or identify the position of and classify objects, computerized object detection systems may be unable to cross-reference images from multiple perspectives of a multi-perspective scene. Instead, automated object detection systems may only be able to analyze images from a single perspective. More particularly, even if a multi-perspective set of images is available to a system capable of performing object detection, the object detection system may be configured to analyze the images from each view in a multi-perspective set independently of each other and thus the object detection system is not capable of cross-referencing one image from one perspective with another image from a different perspective.

As an example, a deep learning neural network-based object detection system may comprise one or more object detectors. Each object detector, in turn, may comprise one or more pipelines of neural networks, which are referred to herein as "object detection pipelines." Each object detection pipeline may comprise a series of interconnected layers. Each layer takes an input, performs a function on an input, and generates an output, which may be processed by a subsequent layer of the pipeline. The general architecture of such neural network-based object detection pipelines will now be described.

The first layer of an object detection pipeline typically takes an image as input and passes through subsequent layers of the pipeline until the final layer of the pipeline generates an output. The output of pipeline may take the form of a set of values each of which indicates a set of likelihoods (referred to as classification scores) that indicate respective likelihoods that one or more regions of the inputted image contain an object belonging to a known class of object. The output of the pipeline may further comprise a set of values, referred to as bounding box scores, that define the shape and position of a bounding box that in turn indicates a position of a detected class of object.

At a high level, shallower layers of an object detection pipeline may identify lower-level (e.g. simpler) features from an image, and deeper layers may identify higher-and-higher level (e.g. more complex) features from an image. Each layer may determine features from the output of the previous layer and may transform the input representation to a different representation that encapsulates the higher-level detailed features. These layers may take various forms.

As examples, such layers may comprise, and in some implementations, may alternate between "convolutional layers" and "pooling layers." A given convolutional layer may receive a set of input pixels for processing, may apply a set of matrices referred to as "kernels" to the set of input pixels to generate a representation of the features identified form that set of pixels, referred to as a feature map. Each given convolutional layer may have a different associated set of kernels.

To apply a given kernel, in an example, the classification neural network may perform a process referred to as convolution, which takes a set of neighboring input values, which may comprise neighboring pixels or neighboring values of a feature map. The classification neural network expresses a given value from the set as a weighted sum of the value and its neighboring values in which the weights for each pixel are defined by the elements of the kernel matrices. The output of a convolutional layer is referred to as a "feature map" because the output contains information about features detected by the convolutional layer.

A pooling layer may selectively downsample values, e.g. pixels or values of a feature map, generated by a previous convolutional layer. More particularly, the pooling layer may determine a set of regions and may apply a pooling function to each of the regions. In an implementation, the pooling layer may apply a max-pool function to each region. The max-pool function may identify a maximum value from a given region, retain the maximum value, and may discard all other values in the region.

An object detection pipeline may first apply the convolution and/or pooling layers to a captured image to generate a convolutional "feature map," which represents the activation of those convolutional layers by a given convolutional layer's input. Layers that generate a feature map may be referred to as "feature extraction layers."

The feature map is effectively a downsampled multi-dimensional representation of features that the convolutional and pooling layers have identified by way of the convolutional and pooling processes performed at each layer. An object detection pipeline may apply multiple convolutional layers. Each given convolutional generates a respective different feature map that represents the application of the given convolutional layer to the input of the given convolutional layer at a spatial resolution that is defined by the given convolutional layer.

Typically, an object detection pipeline attempts to identify classes of objects at multiple different locations of an image. At each image position, the object detection pipeline applies a set of bounding boxes having different aspect ratios to produce a feature map for the combination of a given aspect ratio of bounding box and a position.

Generally, object detectors can be classified into two types: (1) single-stage object detectors, and (2) two-stage object detectors. Both one and two stage object detectors use convolutional neural networks to generate feature maps at various positions and spatial resolutions. Two-stage object detectors differ from single-stage object detectors in that two-stage object detectors use a region proposal network in a first stage of the pipeline to generate regions of interest that are likely to contain objects. The two-stage object detector uses the generated region proposals in a second stage of the pipeline to perform object classification and bounding box regression. By comparison, a single-stage object detector lacks a region proposal network and instead predicts classes and boundary boxes for each detected object without first proposing regions of interest that are most likely to contain an object.

The techniques of this disclosure introduce a new type of layer, referred to as a "fusion layer" (which may also be interchangeably referred to as a "fusion module") that may be inserted into two or more object detection pipelines (e.g., object detection pipelines of single- and two-stage object detectors) that are each dedicated to analyzing a different respective perspective of a scene. Such an object detector that has dedicated object detection pipelines for different perspectives is referred to herein as a "multi-perspective object detector." Inserting one or more fusion layers into a multi-stage object detector allows a fusion layer in an object detector dedicated to analyzing a first perspective to share data object detection data, such as feature map data, with an object detection pipeline dedicated to analyzing a different perspective. As will be described in greater detail, sharing data, such as feature map data, across object detector dedicated to different perspectives, improves object detection accuracy.

At a high level, a fusion layer may comprise a series of sub-layers each of which perform one or more functions that combine data from one perspective with data from another perspective of a scene. According to a more particular implementation, a fusion layer may combine one perspective's feature map with feature map data of a fusion layer map of another different perspective to form a "fused" feature map that effectively cross-references the two (or more) perspectives. These sub-layers may comprise the building blocks of deep-learning object detectors. Examples of such sub-layers may include but are not limited to combinations of: pooling layers, residual layers, convolutional layers, or any other type of layer used in machine learning or deep learning applications. The fused feature map data formed by the sub-layers may then be used by other layers of an object detection pipeline, such as classifier and/or a region proposal network to localize and classify objects within a given input image.

To share feature map data between first and second object detection pipelines having respective a shared fusion layer, and the object detection pipelines must operate on two different perspectives that have a common dimension. For example, one perspective may be a x-y perspective and another perspective may be an x-z perspective of the scene. In such an example, both object detection pipelines perform object detection along the common x-axis dimension. While a fusion layer is described as sharing data across two perspectives, it should be understood that a fusion layer may combine perspective data such as feature map data across more than two perspectives as well.

At a high level, the fusion layer performs a series of functions that allow the fusion layer to summarize the values of a first feature map from a first perspective along the common dimension with a second feature map of a second perspective having the common dimension. Similarly, the fusion layer may combine summarized values of a second feature map from the second perspective along the common dimension with a first feature map of the first perspective having the common dimension. By combining summarized values with a feature map along a common dimension, a fusion layer may increase any activations that are common to both feature maps along the shared dimension, in effect allowing two object detection pipelines to cross-reference each other, thereby resulting in multi-perspective object detection pipelines that more accurately predict object locations and classes.

The functions performed by example first and second fusion layers (denoted respectively as $FL_1$ and $FL_2$) with respect to respective feature maps A and B will now be described in greater detail. Feature map A may be generated by a first object detection pipeline from a first perspective and feature map B may be generated by a second object detection pipeline from a second perspective. Feature maps A and B may share a common dimension or axis, such as an x-axis in this example. A and B may have common dimensions measured in terms of: height (denoted as "h"), width (denoted as "w"), and channels (denoted as "c"). The functions performed by example fusion layers $FL_1$ and $FL_2$ will now be described in greater detail.

To begin the functions of combining feature map data, $FL_1$ may transform feature map A, and $FL_2$ may transform feature map B to a common basis. To transform feature maps A and B to a common basis, $FL_1$ and $FL_2$ may use a set of convolutional and residual layers F. Layers F generate respective outputs α and β in the pooling basis. Mathematically the transformation of the feature maps to the pooling basis can be described as α, β←F(A), F(B) for the set of convolutional and residual layers. Once in the pooling basis, various summary values can be generated and combined, which will be described in greater detail.

After A and B are transformed to α and β in the pooling basis, $FL_1$ may combine rows of first feature map α into a single row that summarizes the columns of α. Similarly, $FL_2$ may combine the rows of β into a single row that summarizes each column β. The value that summarize the row that summarize each row of α and β are referred to as α' and β', respectively. According to an implementation, the summary values α' and β' may be averages as calculated by a pooling layer. These respective pooling averages are generated along unique dimension such that α' and β' have dimensions (i.e. width, channels, i.e., w×c) with entries corresponding to each plane cross-section (e.g., y-z plane cross-section).

After summarizing the rows and columns, the fusion layers $FL_1$ and $FL_2$ transform the summarized values α' and β' from the pooling basis back into the common feature basis, which allows the summarized values of the rows of the feature maps to be combined. Transforming α' and β' may take various forms. According to one implementation, a fusion layer may transform summarized data of two feature maps from different perspectives using a set of convolutional and residual layers, which may be referred to as G. As an example, the fusion layer may apply the set of convolutional/residual layers G to the summarized values α' and β'. The transformation to the common basis can thus be expressed as: α",β"←G(α'),G(β') for set of convolutional and residual layers G.

Additionally, the fusion may apply a set of residual layers H to the feature maps A and B to produce values A' and B'.

After the summarized values α' and β' have been transformed back to a common feature map basis and the residual values A' and B' have been produced, the fusion layer may then combine (e.g., by summing) the summarized values α' and β' and the respective residual values A' and B' along the height dimension. After combining the summary values and residual values, fusion layers $FL_1$ may apply a set of residual layers K to the sum of A' with β". Similarly, $FL_2$ may apply the set of residual layers K to the combined sum of B' with α". The two combinations of values can be expressed mathematically as: A", B"←K(A'+β"), k(B'+α") for set of residual layers K.

The result of the sum and the application of residual layers K is a set of fused features maps. These fused feature maps may have more pronounced activations if the original (i.e. non-fused) feature maps from the two different perspectives have high activations along a shared dimension. Thus, the resulting fused feature maps may effectively cross-reference feature map data from a first perspective into a feature map of a second perspective to improve detection confidence and accuracy as will be described in the empirical results disclosed herein.

Also, as will be described in greater detail below, fused feature maps may be inserted at various points in an object detector architecture and may be inserted into single-stage and two-stage object detectors as well as any object developed now or in the future that leverage feature maps and/or on other various data representations produced by an object detection pipeline as well. In one implementation, one or more fusion layers may be inserted into a two-stage object detector, such as the Faster R-CNN object detector, for instance immediately after feature extraction. In a single-stage object detector implementation, such as the Feature Pyramid Network (FPN), fusion layers may be inserted to fuse feature maps at the lateral connections across the sides of the FPN or after the FPN but before the prediction subnets. Both of these implementations are described in greater detail herein. fusion layers may be inserted into various other type of object detector architectures and at various other locations of those object detector architectures as well.

The techniques of this disclosure may have broad general application that may improve the performance of object detectors generally. Additionally, the techniques of this disclosure may have application to the security field. In the security field, a process referred to as security screening is performed at security checkpoints to determine whether an object should be permitted to pass through that security checkpoint. The security screening processes may involve various aspects. One such aspect that may be performed as part of a security screening is the process of visual search.

The object detection techniques described herein have specific applications in the context of security screening. As an example, the visual search performed at a typical security checkpoint may involve detection devices (e.g., X-Ray scanners, CT scanners, etc.) that are configured to capture images of a scene to detect any objects within that scene.

Such detection devices may produce images from multiple different perspectives. The improvements to object detection techniques described in this disclosure may have specific utility in the context of analyzing multi-perspective data generated by detection devices such as multi-perspective data generated by dual view X-Ray scanners, CT scanners, etc.

As an example, multi-perspective object detectors may be used to analyze multi-perspective data to detect and classify objects from multi-perspective images to determine whether the classified object meet or violate security criteria. By adding fusion layers into these object detectors, the data from multi-perspective detection devices can be cross-referenced by an object detector that utilizes fusion layers to further improve object detection performance in the context of security screening.

While the techniques of this disclosure are described in the context of security screening, it should be understood that object detectors that use fusion layers may be used in various other contexts as well.

According to one aspect of this disclosure, a device includes at least one processor, a memory, and a non-transitory computer-readable storage medium storing instructions that are executable to cause the at least one processor to: obtain a first image from a first positional angle, wherein the first image is from a first perspective of a scene, receive a second image from a second, different positional angle, wherein the second image is from a second perspective of the scene, and perform, with an object detector, object detection on the first image from the first perspective and on the second image from the second perspective by cross-referencing data related to the first image and the second image within the object detector.

Another aspect of this disclosure may be implemented as a method. The method may comprise obtaining, with an object detector, a first image from a first positional angle, wherein the first image is from a first perspective of a scene, receiving, with the object detector, a second image from a second, different positional angle, wherein the second image is from a second perspective of the scene, and performing, with the object detector, object detection on the first image from the first perspective and on the second image from the second perspective by cross-referencing data related to the first image and the second image within the object detector.

Another aspect of this disclosure may be implemented as a non-transitory computer-readable storage medium storing instructions that are executable to cause at least one processor to: obtain a first image from a first positional angle comprising a first perspective of a scene, receive a second image from a second, different positional angle comprising a second perspective of the scene, and perform, with an object detector, object detection on the first image from the first perspective and on the second image from the second perspective by cross-referencing data related to the first image and the second image within the object detector.

II. Example Computing System

FIG. 1 is a conceptual diagram illustrating an example computing device that may be configured to train and execute an object detector, such as a multi-perspective object detector configured in accordance with the techniques of this disclosure. At a high level, FIG. 1 illustrates a computing system 100 that may include at least one processor 102, data storage 104, and optionally at least one graphics processing unit (GPU) 104.

Processor 102 may comprise one or more of a central processing unit (CPU), field programmable gate array (FPGA), application-specific integrated circuit (ASIC), or any combination thereof. Processor 102 may take various other forms as well.

GPU 104 may comprise one or more graphics processing units that may be configured along with CPU 102 to perform machine learning, deep learning, and more particularly object detection. GPU 104 may comprise a plurality of parallel and pipelined single instruction multiple data (SIMD) units that may be configured to simultaneously perform mathematical operations on multiple operands. Examples of such GPUs may include GPUs made by AMD, NVIDIA, Intel, etc. In some implementations, GPU 104 may comprise one or more processors that are purpose-built for performing machine learning. Examples of such purpose-built machine learning processors may include Google's Tensor Processing Unit (TPU) as one such example. GPU 104 may take various other forms as well.

Data storage 104 may comprise any type volatile or non-volatile storage, such as RAM, ROM, disk or flash-based storage, etc. While illustrated as being a physical component of computing system 100, data storage 104 may be separate from processor 102 and may be coupled to processor 102 via a communication interface, such as a network or storage interface in some examples. Data storage 104 may be configured to store program instructions that are executable to cause processor 104 and/or GPU 106 to train and execute an object detector that may comprise a multi-perspective object detection model (i.e. a multi-perspective object detector) that employs one or more fusion layers in accordance with this disclosure.

In one implementation, which may occur in the context of security screening, computing system 100 may be connected with one or more detection devices. The detection devices may also capture images of a scene.

Example detection devices may comprise x-ray scanners, MRI scanners, CT scanners, spectral band scanners, millimeter wave scanners, or any other scanning device now or later devised. Other manners of detection devices are also possible. For instance, computing system 100 may be configured to execute software code that interfaces with a checkpoint screening system, such as for example, an Astrophysics checkpoint screening system, a Rapiscan checkpoint screening system (current Rapiscan examples include Rapiscan 618XR HP, 620XR HP, 622XR HP, 618XR, 620XR, 620DV, or 622XR), a Smiths checkpoint screening system, etc. In other examples, computing system 100 may be implemented at locations remote from the scanned object or scene. For instance, computing system 100, and/or portions thereof, may be located in a remote office, in the cloud, on a moving vehicle or aircraft, and so on.

The images captured by the detection devices may represent the captured data using various representations. As examples, the captured images may be represented using pixels, voxels, polygons, three-dimensional slices, or any other type of element that may generally be used to construct 2D or 3D image data.

In some examples, the images captured by the detection devices may be captured in a DICOS ("Digital Imaging and Communication for Security" standard published by the National Electrical Manufacturers Association) format. The captured images may contain metadata, which may comprise information related to material density, geometric dimensions, and/or atomic numbers, and/or spectral data corresponding to various regions or graphical elements in a captured image, as some non-limiting examples. It should be understood that image data may be captured in other formats and the metadata may take other various forms as well.

The detection devices may capture one or more images for each object being scanned. As examples, detection devices may capture a single image of an object, or multiple different images of an object. The multiple images may be of a same perspective or from multiple different perspectives. In some examples, the captured images may comprise three-dimensional "slices" of an object, wherein each slice represents the scanned object at a different level of scan depth.

An image captured by a detection device may comprise representations of one or more objects represented in each captured image. As an example, a detection device may capture an image of an object comprising a piece of luggage. In this example, the piece of luggage may contain a variety of different items, such as a shoe and a gun. The shoe and gun may each be items represented in the captured image. It is worth noting that the shoe and gun items are not yet classified as a "shoe" or "gun," but rather only show up, as a whole or in part, in the captured image (i.e., at this point in time, only the person who packed the luggage might know that there is a shoe and gun).

In some examples, computing system 100 may be configured to generate output data based on the output of an object detector. In some examples, computing system 100 may output the generated output data to a display for analysis, for example by a human security screener.

Additional detail regarding a security screening system that utilizes an object detector are described in greater detail in Synapse Technology Corporation's U.S. patent application Ser. No. 15/800,688, filed on Nov. 1, 2017, and titled, "Generating Graphical Representations of Scanned Objects".

While some examples described herein may refer to functions performed by given actors such as "users" and/or other entities, it should be understood that this description is for purpose of explanation only. The claims should not be interpreted to require action by any such example actor unless explicitly required by the language of the claims themselves.

Figure 2:
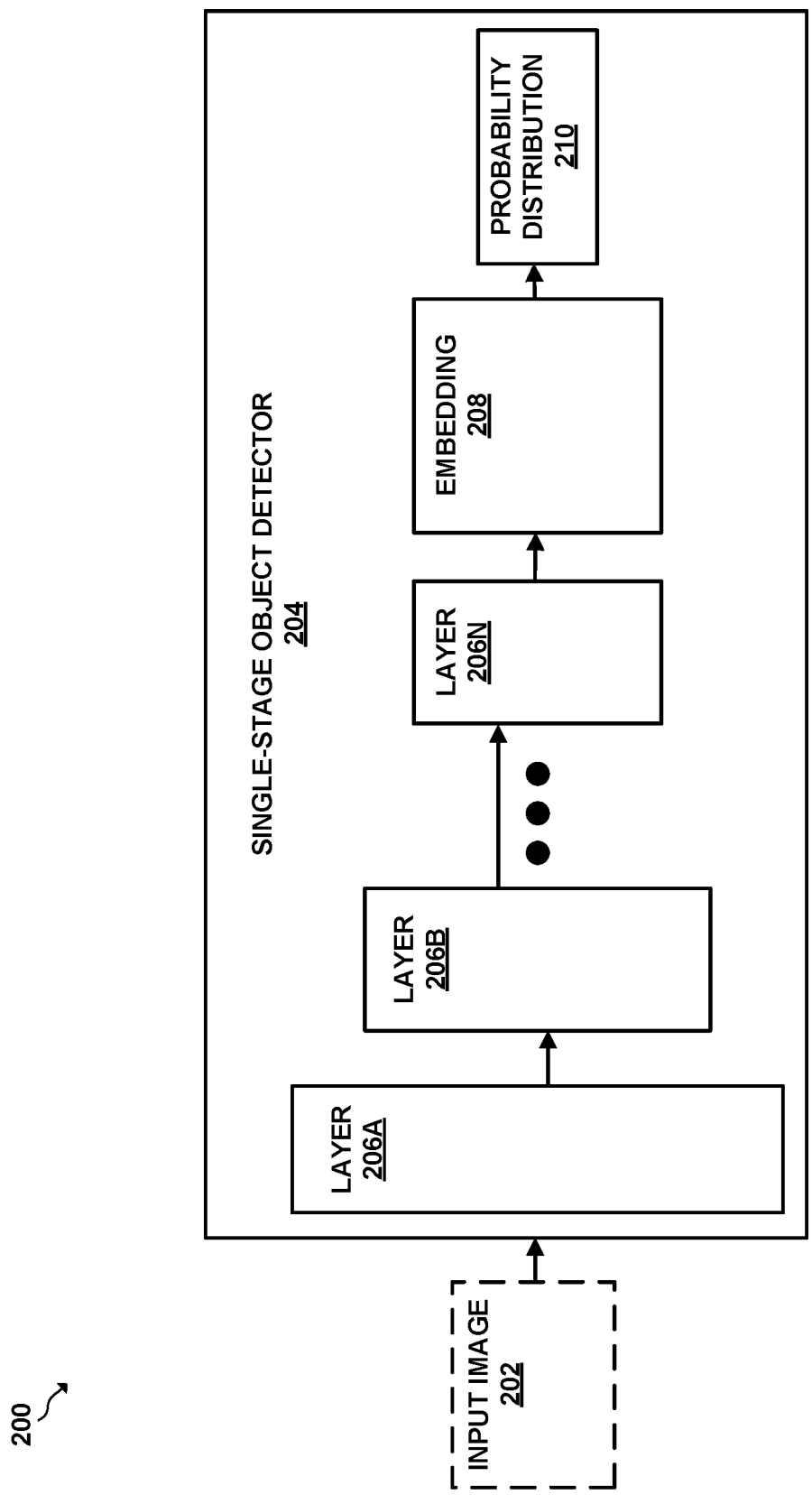
FIG. 2 is a conceptual diagram of a system that includes a single-stage object detector.

FIG. 2 is a conceptual diagram of a system that 200 includes a single-stage object detector 204. That takes image 202 as input, performs object detection on the input image 202, localizes and classifies any object identified within the image.

At a high level, single-stage object detector 204 comprises a series of convolutional layers. 206A-206N (collectively "layers" 206). A given convolutional layer of layers 206 may receive a set of input values, such as pixels, voxels, 3D coordinates, etc., for processing, may apply a set of matrices referred to as "kernels" to the set of input values to generate a set of values referred to as a feature map. Each convolutional layer of layers 206 may have a different associated set of kernels.

In general the values of the kernels of the layers of any object detector, including single-stage object detector 204 are "learned" during a training phase during which training images (also referred to as "ground truth" images) that are labeled with correctly-classified objects and their respective positions as defined by bounding boxes are fed into the object detector.

The object detector learns the values of the kernel matrices typically by minimizing a function. As an example, a loss function may penalize incorrectly-classified objects and/or incorrectly positioned bounding boxes and may positively reinforce correctly-classified objects and/or correctly positioned bounding boxes to define a set of kernel matrices.

To apply a given kernel, the classification neural network performs a process referred to as convolution, which takes a set of neighboring values (e.g. pixels or values from a feature map) as input, and expresses a given value from the set as a weighted sum of the given value and its neighboring values in which the weights for each pixel are defined by the elements of the kernel matrices. The set of output values generated by a convolutional layer is referred to as a "feature map" because the output contains information about features detected by the convolutional layer.

In a single-stage object detector, each convolutional network performs a convolution at a set of different locations of an input image that form a grid. Each location may be referred to as a "cell." The result of applying a convolutional network to a cell results in a feature map for that given cell.

In some implementations, the feature map generated by a feature extraction layer may be passed to a classification layer. In other implementations, the feature map generated by a convolutional feature extraction layer may be passed to a subsequent feature extraction layer. In the case that a feature map is passed to a classification layer, the classification layer may generate a probability distribution comprising a set of values, each of which indicates a respective likelihood that the portion of the image represented by the combination of a bounding box at the location of a given cell belongs to a corresponding class.

In the case in FIG. 2, the feature map generated by feature extractor 206A may be the input to subsequent layer 206B, which may apply further convolutional operations on the input feature map to generate a feature map that is capable of detecting more complex features from an input image. The process of generating feature maps and passing the generated feature maps through subsequent feature extraction layers may continue until an embedding 208 and a final probability distribution 210 are generated.

One or more fusion layers may be added to share feature map data between two single-stage object detection pipelines as will be described in greater detail with respect to FIGS. 3 and 4.

III. Example Fusion Layers

Figure 3:
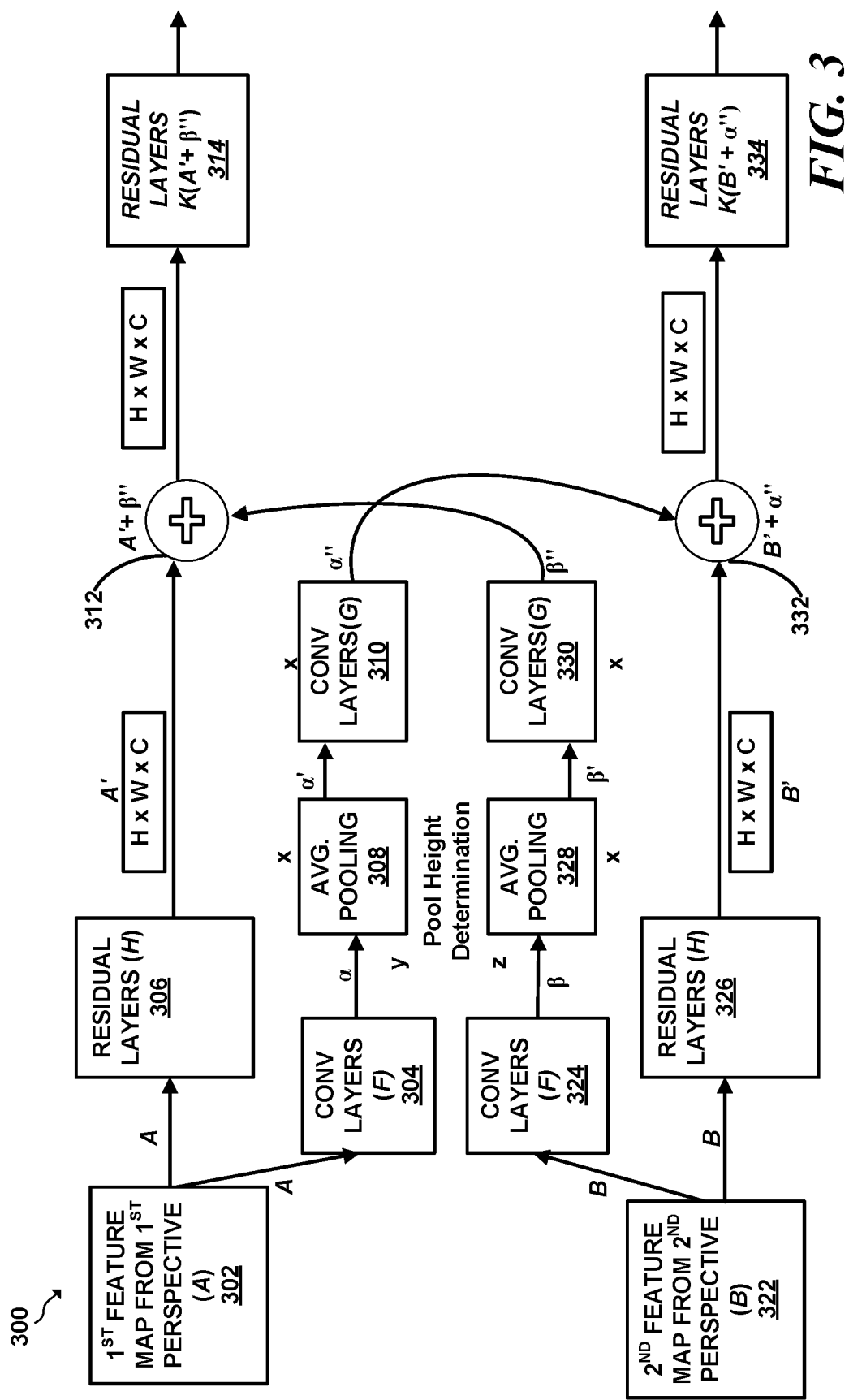
FIG. 3 is a conceptual diagram of a fusion layer that allows an object detection pipeline to share feature map data with a different object detection pipeline of an object detector in accordance with this disclosure.

FIG. 3 is a conceptual diagram of a layer that allows an object detection pipeline to share feature map data with a different object detection pipeline in accordance with this disclosure. At a high level, FIG. 3 depicts a fusion layer 300. At a high level, fusion layer 300 inputs a feature map from a first perspective as input, pass the feature map through a series of transformational layers, such as convolutional, residual, and/or pooling layers, to form a set of values (referred to as a set of "summary values") that summarizes a feature map along a given dimension, such as a height dimension. After forming the set of summary values, first fusion layer 300 combines the set of summary values generated by that fusion layer with a representation of a feature map from a different perspective, thereby resulting in a combined set of values that represent a combination of a representation of feature map 302 from the first perspective and a representation of feature map 322 from the second perspective. The flow of operations through the fusion layer 300 will now be described in greater detail.

It should be understood that fusion layer 300 comprise a series of sub-layers that are made up of neural networks. Each of these neural networks take an input perform operations on the input and generates an output. Just like most neural networks, fusion layer 300 "learns" what values to apply to a given input value by analyzing and learning values to apply with each of its sub-layers from a set of ground truth (e.g., labeled) training data that fusion layer 300 analyzes during a training phase. Each sub-layer of fusion layer 300 may then apply the learned values, such as learned kernel weights, etc., to input values during an execution phase that lacks ground truth information such as labeling, etc.

To begin, fusion layer 300 may input first feature map 302 from the first perspective and second feature map 322. First and second feature maps 302, 322 are generated by respective first and second object detection pipelines each of which are dedicated to analyzing a different perspective of a scene. For example, the first object detection pipeline may be dedicated to performing object detection from an x-y perspective of scene, and the second object detection pipeline may be dedicated to performing object detection on an x-z perspective of scene. First feature map 302 from the first perspective may be referred to as "A," and second feature map 322 from the second perspective may be referred to as "B." Feature maps 302 and 322 may have respective height, width, and channels (referred to as "h," "w," and "c," respectively) of data.

After being input into first fusion layer 300, first feature map 302 is input to a set of residual layers 306 (denoted as "H") and also in parallel into a set of convolutional/residual layers 304 (denoted as "F"). Similarly, second feature map 322 is input to a set of residual layers 326 ("H") and also into a set of convolutional/residual layers 304 ("F"). It should be understood that layers sharing a common identifier (e.g., "H," "F," etc.) may share a common set of weights learned the training phase.

To begin, residual layers F 304 and 324 transform first feature map 302 and second feature map 322 to a pooling basis. In an implementation, layers F 304 and 324 may comprise a 3×3 convolutional layer. The output of convolutional/residual layers 304 and 324 generate respective outputs α and β in the pooling basis. The pooling basis is a mathematical basis in which values from the feature maps may be mathematically combined (pooled) in some fashion. Mathematically the transformation of the feature maps to the pooling basis can be described as: for the set of convolutional and residual layers 304 and 324, respectively.

After A and B are transformed to α and β in the pooling basis, a set of pooling layers 308 may combine rows of first feature map α into a single row that summarizes the columns of α. Similarly, pooling layers 328 may combine the rows of β into a single row that summarizes each column. The value that summarize the row that summarize each row of α and β are referred to as α' and β', respectively. According to an implementation, the summary values α' and β' may be averages as calculated by pooling layers 308, and 328, respectively. These respective pooling averages are generated along unique dimension such that α' and β' have dimensions (i.e. width, channels, i.e., w×c) with entries corresponding to each plane cross-section (e.g., y-z plane cross-section).

After summarizing the rows and columns, convolutional/residual layers (denoted as "G") 310 and 330, respectively, transform the summarized values α' and β' from the pooling basis back into the common feature basis, which allows the summarized values of the rows of the feature maps to be combined. In an implementation, layers G 310 and 330 may comprise a 1×3 convolutional layer. As an example, the fusion layer may apply the set of convolutional/residual layers G are to the summarized values α' and β'. The transformation to the common basis can thus be expressed as: α",β"←G(α'), $\underline{G}$(β') for set of convolutional and residual layers G.

In parallel with the operations of layers 304, 324, 308, 328, 310, and 330, a set of residual layers His applied to the feature maps A and B to produce values A' and B'. In an implementation, residual layers H may take the sum of a 3×3 convolutional layer and the identity function. First fusion layer 300 and second fusion layer 320 may apply residual layers 306, 326 to first feature map 302 (A) and second feature map 322 (B) to produce values A' and B', respectively. Applying residual layers 306, 326 may help to ensure stability.

After the summarized values α' and β' have been transformed back to a common feature map basis and the residual values A' and B' have been produced, the first fusion layer 300 and second fusion layer 320 fusion layer then combines the pooled values along the height dimension from one perspective to the feature map from the other perspective. The function of combining the pooled from one dimension to the feature map of another dimension may take various forms. According to the implementation illustrated in FIG. 3, fusion layer 300 may perform an addition to combines the pooled values along the height dimension from one perspective to a feature map from the other perspective. More particularly, fusion layer 300 may combine A' with β" by summing A' with each row of β". Similarly, fusion layer 300 may combine B' with α" by summing each row of B' with α". The two combinations can be expressed mathematically as: A", B"←K(A'+β"), k(B'+α").

After combining the pooled values along the height dimension from one perspective to a feature map from the other perspective, the resulting combined values may be input to a residual layer, the combined values may be input to respective sets of residual layers 314 and 334 (referred to as "K"). As with residual layers 306 and 326 (H). Applying residual layers 314, 334 may help to ensure stability.

The result of applying residual layers K (314, 334) is a set of fused features maps. These fused feature maps may have more pronounced activations if the original (i.e. non-fused) feature maps from the two different perspectives have high activations along a shared dimension. Thus, the resulting fused feature maps may effectively cross-reference feature map data from a first perspective into a feature map of a second perspective to improve detection confidence and accuracy as will be described in the empirical results disclosed herein.

IV. Example Fusion Layer Implementations

Figure 4:
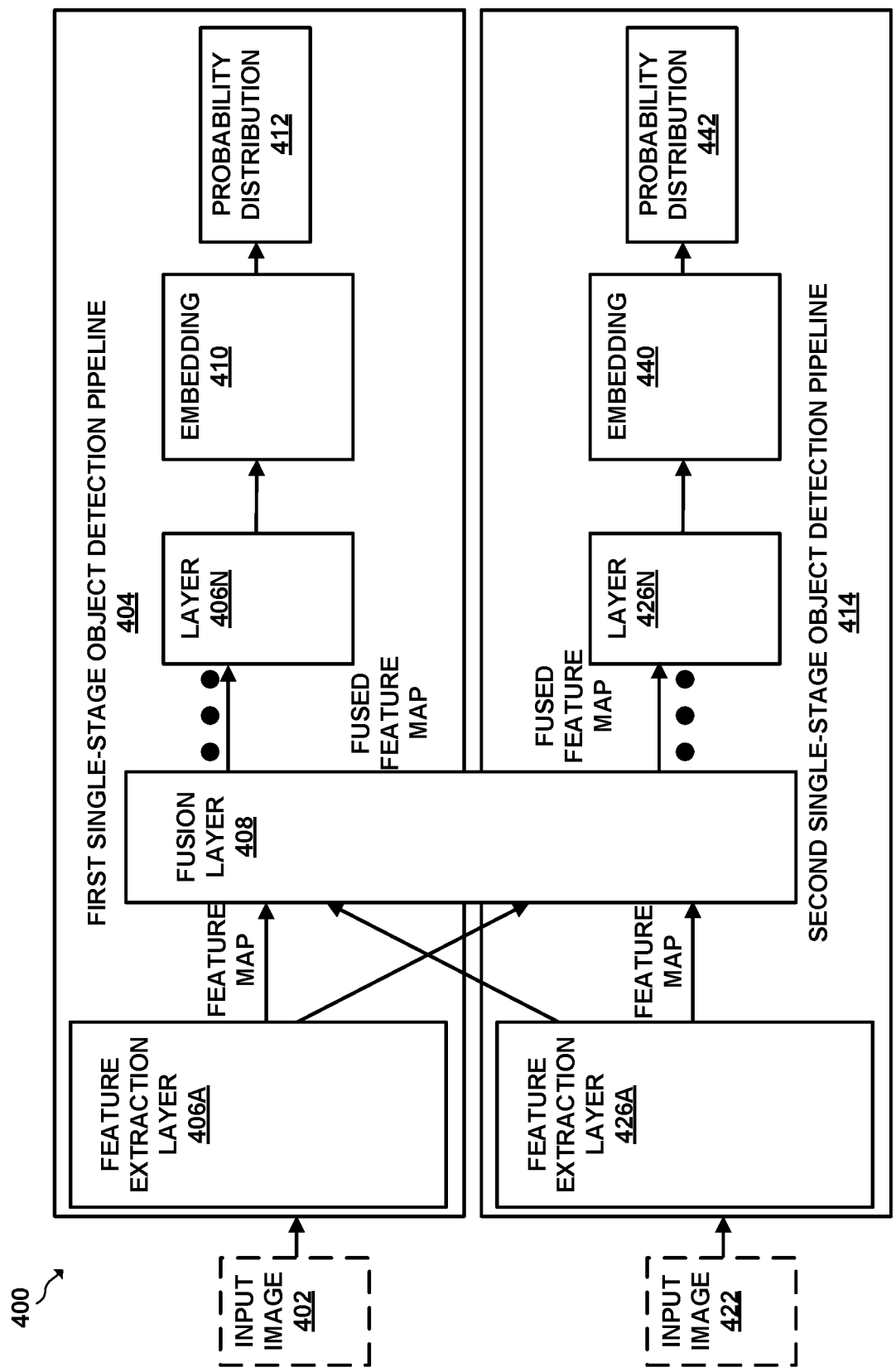
FIG. 4 is a conceptual diagram of a single-stage multi-perspective object detector that is configured to utilize one or more fusion layers in accordance with this disclosure.

FIG. 4 is a conceptual diagram of a single-stage multi-perspective object detector that is configured to utilize fusion layers in accordance with this disclosure. In the example of FIG. 4, a multi-perspective object detector consists of a first single-stage object detection pipeline 404 and a second single-single stage object detection pipeline 414. First single-stage object detection pipeline 404 and second object detection pipeline 414 may be conceptually similar to the single-stage object detector 204 illustrated in FIG. 2 with the addition of a fusion layer 408 in between first single-stage object detection pipeline 404 and second single-stage object detection pipeline 414.

At a high level, first single-stage object detection pipeline 404 and second single-stage object detection pipeline 414 may each perform object detection on respective input images 402 and 412, which each depict different perspectives of a scene. As an example, first input image 402 may depict an x-z perspective of a scene while second input image 404 depict a second perspective, such as an x-y perspective of the scene.

First single-stage object detection pipeline 404 and second object detection pipeline 414 comprise a series of layers that extract various features from first input image 402 and second input image 412 by performing convolution and pooling operations to the input of each layer to extract the feature of each layer. Finally, first single-stage object detection pipeline 404 and second single-stage object detection pipeline 414 generate respective embeddings 410 and 440 and a first probability distribution 412 and a second probability distribution 442 that indicates any identified objects and their respective classes that the object detection pipelines identified by each object detection pipeline.

First single-stage object detection pipeline 404 and second object detection pipeline 414 also include fusion layer 408. At a high level, fusion layer 408 may combine a feature map of the first single-stage object detection pipeline 404 with values derived from a corresponding feature map of second single-stage object detector detection pipeline 414. Similarly, fusion layer 408 may combine a feature map of second single-stage object detection pipeline 414 with values derived from a corresponding feature map of first single-stage object detection pipeline 404.

In an implementation, fusion 408 layer performs a series of functions that allow fusion layer 408 to summarize the values of a first feature map along a common dimension and to combine the summarized values with a feature map of the second perspective having the common dimension. By combining the summarized values along a common dimension, fusion layer 408 may amplify any activations that are common to both feature maps, in effect allowing two object detection pipelines to cross-reference each other, thereby resulting in multi-perspective object detection pipelines that more accurately predict object locations and classes as compared to independent object detection pipelines that are not capable of sharing data, such as feature map data, with each other.

The first single-stage object detection pipeline 404 and second single-stage object detection pipeline 414 depicted FIG. 4 may generally correspond to any single-stage object detectors now known or invented in the future. Examples of such single-stage object detectors may comprise: YOLO[1], SSD[2], AlexNet[3], RetinaNet[4], VGGNET[5], or combinations thereof, as some non-limiting examples.

Figure 5A:
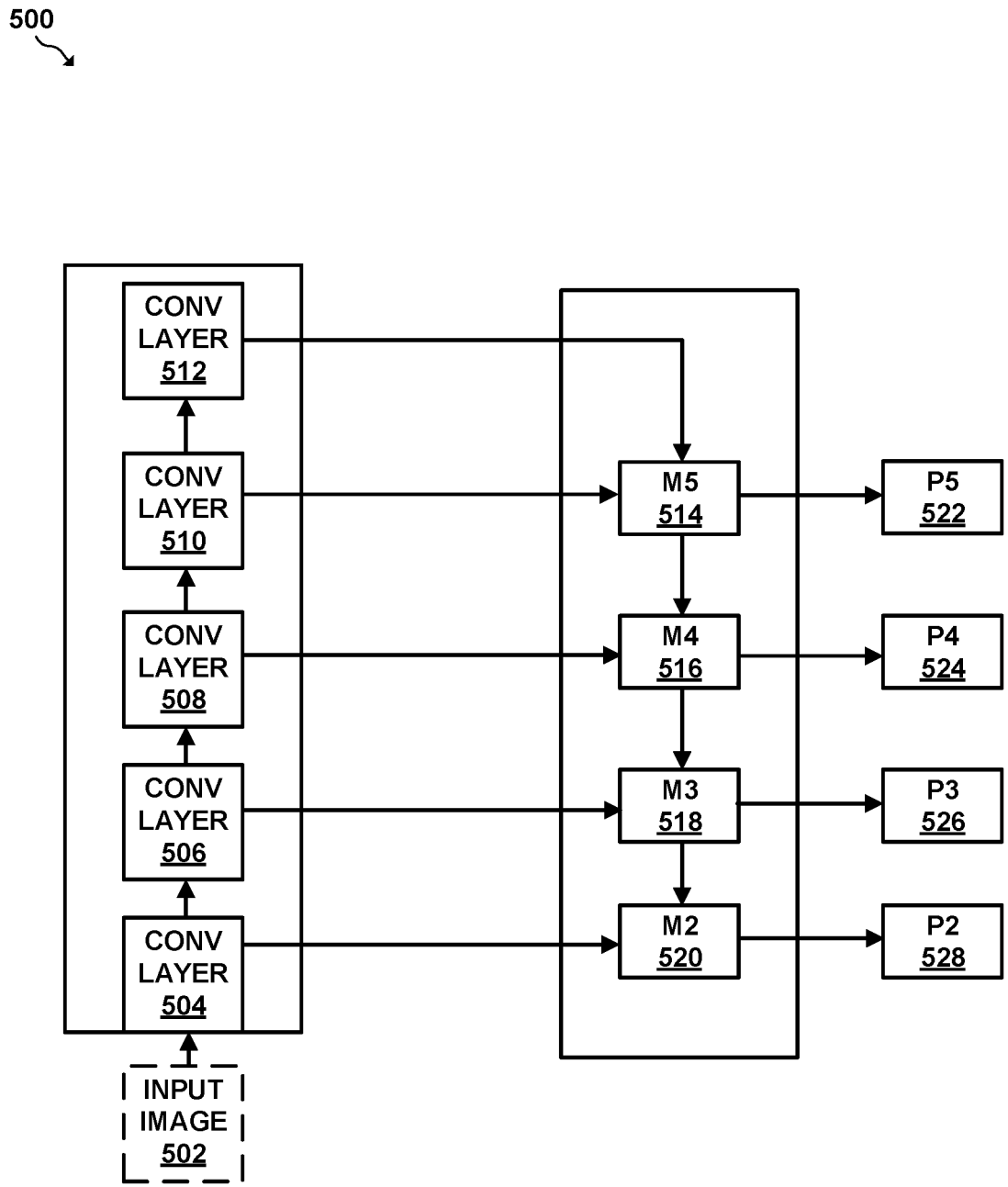
FIG. 5A is an example of a feature extractor neural network that may be used in conjunction with one or more fusion layers.

[1] You Only Look Once: Unified, Real-Time Object Detection by Redmon et al., available at https://arxiv.org/pdf/1506.02640.pdf.
[2] SSD: Single Shot MultiBox Detector by Wei Liu et al., available at: https://arxiv.org/abs/1512.02325.
[3] ImageNet Classification with Deep Convolutional Neural Networks, available at https://papers.nips.cc/paper/4824-imagenet-classification-with-deep-convolutional-neural-networks.pdf.
[4] Focal Loss for Dense Object Detection by Tsung-Yi Lin et al., available at https://arxiv.org/pdf/1708.02002
[5] Very Deep Convolutional Networks for Large-Scale Image Recognition by Simonyan et al., available at: https://arxiv.org/pdf/1409.1556.pdf Turning now to FIG. 5A, an example of a feature extractor neural network that may be used in conjunction with one or more fusion layers is illustrated. FIG. 5A illustrates a feature extractor 500, which may generally take the form of a "pyramid" feature extractor. An example of such a pyramidal network may be the FPN ("Feature Pyramid Network") feature extractor.[6]

[6] Feature Pyramid Networks for Object Detection by Tsung-Yi Lin et al., available at: https://arxiv.org/pdf/1612.03144

At a high level, a pyramid feature extractor is comprised of a bottom-up pathway that takes input image 502 as input. The bottom-up pathway is similar to a typical convolutional network used for feature extraction such as layers 206 illustrated in FIG. 2. A pyramid feature extractor also includes a top-down pathway. The bottom-up pathway may in the example of FIG. 5A may consist of convolutional layers 504, 506, 508, 510, and 512. The spatial resolution may decrease as feature flow from bottom to top of the bottom-up pathway.

The top-down pathway may consist of "M" layers M5 514, M4 516, M3 518, and M2 520. At a high level, values are upsampled and convolved as they proceed from top to bottom through the top-down pathway. Additionally, FPN may include lateral connections between the bottom-up and top-down pathways. In addition to upsampling values from preceding "M" layers, each "M" layer also applies a convolutional filter to the feature map received from a convolutional layer.

After the top-down pathway upsamples any values received from a preceding "M" layer and applies a convolution filter to any values received from a lateral connection, an "M" layer in the top-down pathway applies a 3×3 convolution filter to generate and output each prediction ("P") value, i.e. P5 522, P4 524, P3 526, and P2 528. Each "P" value may comprise a feature map that may be used by an object detector, such as an RPN, or another object detector to identify and classify the objects within the input image 312.

Figure 5B:
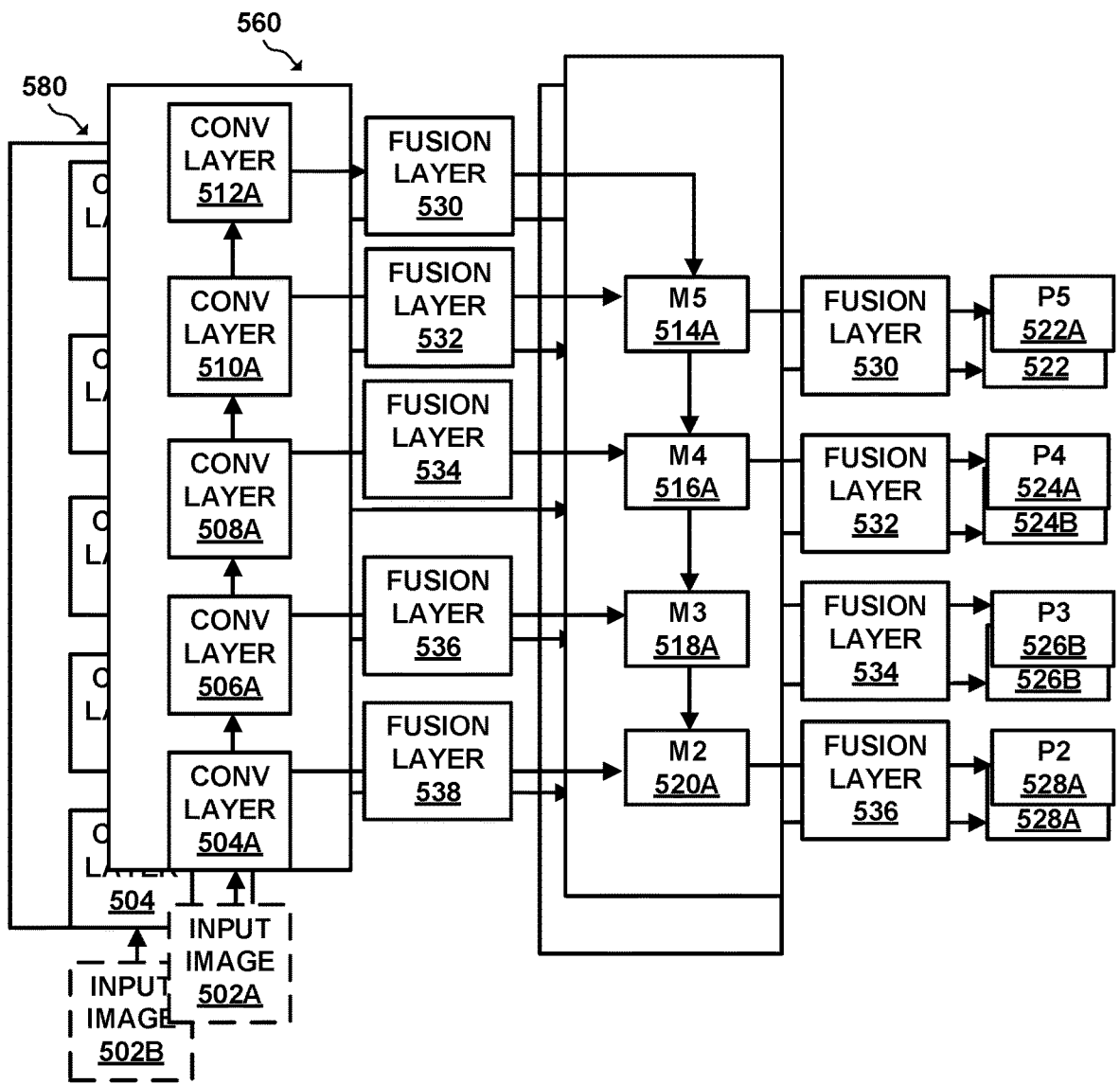
FIG. 5B is an example of a multi-perspective version of a feature extractor.

Turning now to FIG. 5B, a multi-perspective version of the feature extractor illustrated in FIG. 5A is illustrated. In FIG. 5B, there is a first feature extractor 560 dedicated to analyzing a first perspective, and a second feature extractor 580 dedicated to analyzing a second, different perspective. First feature extractor 560 and second feature extractor 580 may include fusion layers similar to those described with respect to FIG. 3. According to some implementations, fusion layers, such as any of fusion layers 530, 532, 534, 536, and/or 538, may be inserted between the lateral connections of first feature extractor 560 and second feature extractor 580. As another example, one or more fusion layers may be inserted between the outputs of each of "M" layers 514, 516, 518, and 520A and B. As yet another example, fusion layers, such as fusion layers 530, 532, 534, and/or 536 may be inserted after the output of each M layer.

Figure 6A:
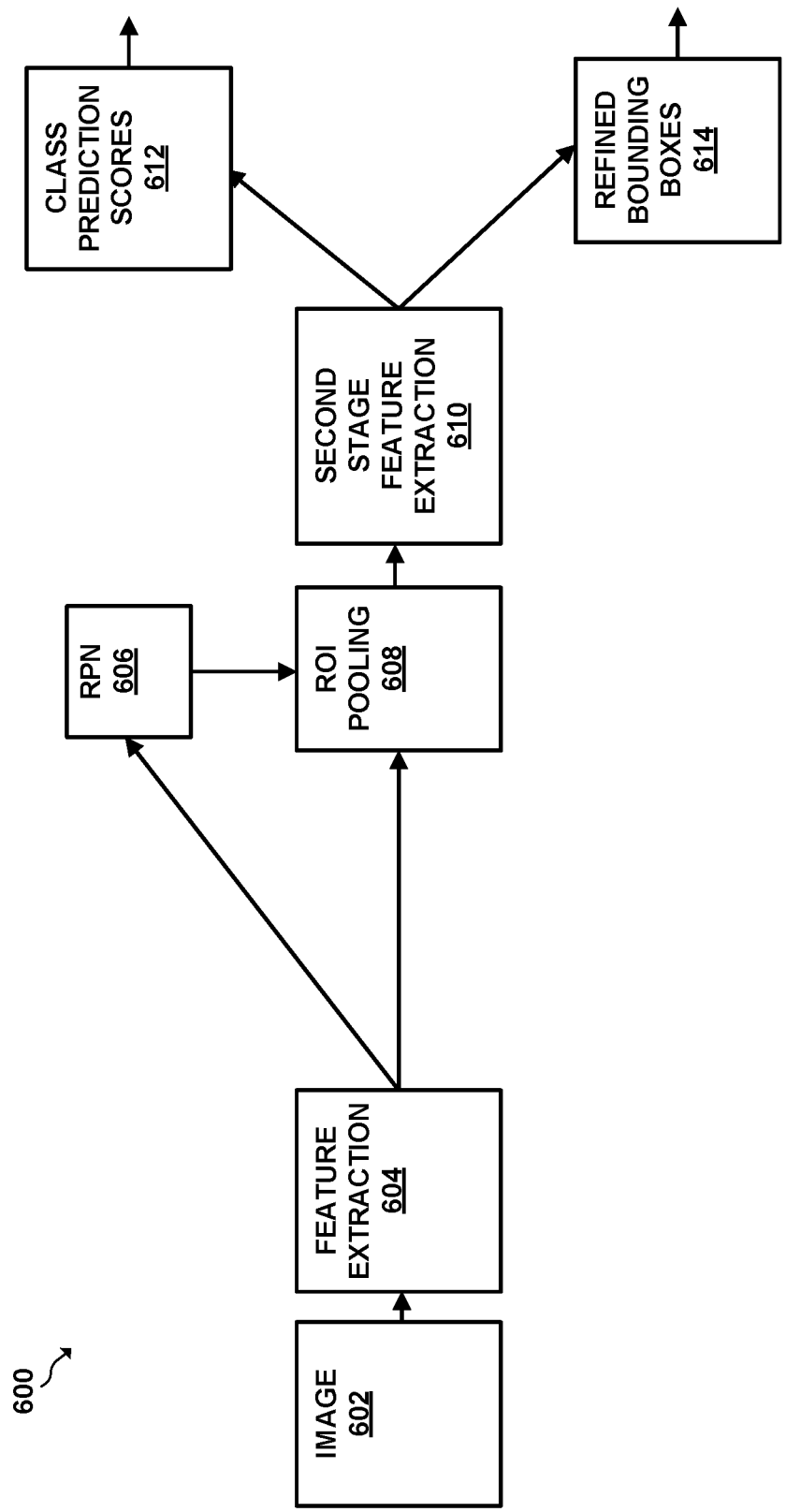
FIG. 6A is a conceptual diagram of an example two-stage object detector.
Figure 6B:
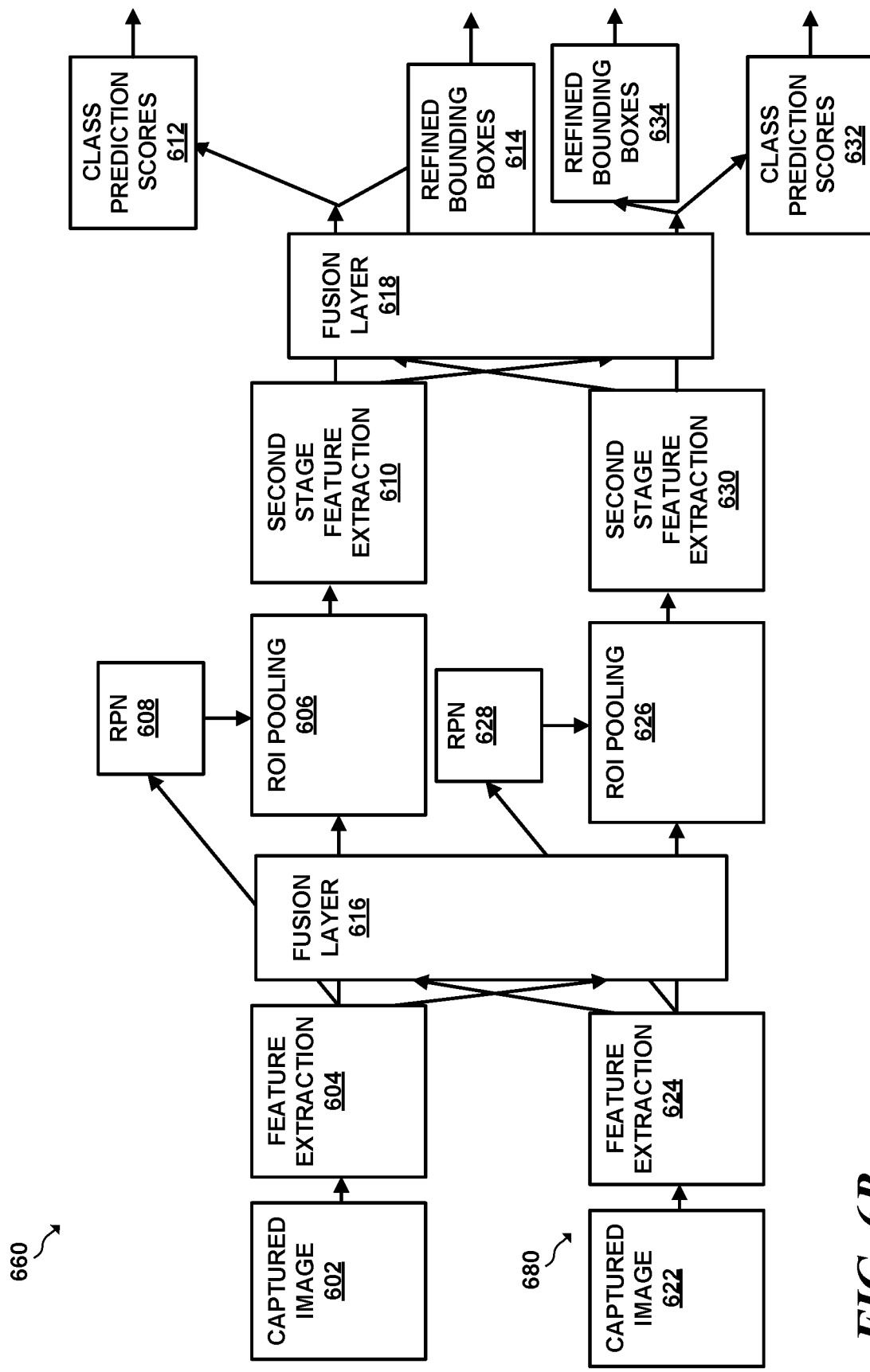
FIG. 6B is a conceptual diagram of a multi-perspective object detector that utilizes one or more fusion layers in accordance with the techniques of this this disclosure.

Turning now to FIGS. 6A-6B, two-stage object detectors in which fusion layers may be implemented will now be described in greater detail with respect to FIGS. 6A-B.

FIG. 6A is a conceptual diagram of an example two-stage object detector (which may also be referred to as a "two-stage object detection pipeline" when two or more such two-stage object detectors are included in an object detection system architecture) 600. Conceptually, two-stage object detector 600 illustrated in FIG. 6A has an additional stage, referred to as a region proposal network (RPN), such as RPN 606, that performs additional functions not performed in a one-stage object detector. More specifically, the RPN of a two-stage object detector is trained to identify, in a class-agnostic manner, regions of an image that are most likely to contain an object. After the RPN identifies regions that the RPN determines are most likely to contain an object, RPN 606 then passes the region information to subsequent feature extraction layers that perform feature extraction and classification on the identified regions identified by RPN 606.

More particularly, in the example of FIG. 6A, the feature extraction unit 604 takes input 602 as input. Feature extraction unit 604 may apply various filters, such as convolutional, residual, and pooling layers, as some examples, to image 602 to extract an initial set of feature maps. The applied filters cause RPN 606 to analyze the initial set of feature maps generated by feature extraction unit 604 to determine regions of interest that may contain objects. The output of RPN 606 is a set of values and each value in the set indicates a likelihood that a given region contains an object. Each such value that indicates a likelihood is referred to as herein as a "region proposal score." The region proposal score may indicate the confidence that the region proposal network has that a given bounding box that indicates a given region of captured image 602 contains an object. More particularly, the region proposal score may represent how well a given region of image 602, defined by the combination of a position of a given anchor box of image 602, encapsulates an object. This region proposal score may be relatively agnostic to the type of item encapsulated. In various examples, a region proposal score may be between 0 and 1, inclusive. The region proposal score may be defined in various other manners as well.

After determining the set of region proposal scores, in some implementations, ROI pooling unit 608 may reduce the number of region proposals generated by RPN 606 to a more manageable number for further analysis. More particularly, ROI pooling unit 608 may comprise an ROI pooling layer that takes region proposals and reshape the region proposals into fixed-size regions. In a particular implementation, ROI pooling layer 608 may use a function such as a max pooling function to convert the features inside any valid region of interest into a small feature map with a fixed spatial extent. After generating these small ROI feature maps, ROI pooling layer 608 may input the ROI feature maps into one or more fully-connected layers (not pictured) to generate an ROI vector.

Finally, the outputs of the fully-connected layers (e.g., the ROI vector, etc.) are inputted into second stage feature extraction layer 610, which generates two outputs: (1) class prediction scores, and (2) refined bounding boxes 614.

Second stage feature extraction layer 610 may comprise a support vector machine (SVM), softmax, or another form of classifier. In any case, second stage feature extraction unit 610 may generate class prediction scores 612 and refined bounding boxes 614. Class prediction scores 612 comprises a set of values in which each value indicates a respective likelihood that a given refined bounding box contains a given class of object or depicts a background. Refined bounding boxes 614 comprise the set of refined bounding boxes that second stage feature extraction unit 610 determined are most likely to contain objects.

While FIGS. 6A and 6B illustrate particular two-stage object detector, it should be understood that FIGS. 6A and 6B may represent any two-stage object detector such as R-CNN[7], Fast R-CNN[8], Faster R-CNN[9], Mask R-CNN[10], etc.

[7] "Rich feature hierarchies for accurate object detection and semantic segmentation," by Girshick et al., arXiv:1311.2524, available at: https://arxiv.org/abs/1311.2524
[8] Fast R-CNN by Ross Girshick, https://arxiv.org/pdf/1504.08083.pdf
[9] Faster R-CNN: Towards Real-Time Object Detection with Region Proposal Networks by Ren et al., https://arxiv.org/pdf/1506.01497.pdf
[10] Mask R-CNN by He et al., available at https://arxiv.org/pdf/1703.06870.pdf Turning now to FIG. 6B, FIG. 6B is a multi-perspective object detector that utilizes fusion layers in accordance with the techniques of this this disclosure. At a high level, FIG. 6B illustrates a first two-stage object detection pipeline 660 that is dedicated to analyzing a first perspective, and a second object detection pipeline 680 dedicated to analyzing a second perspective. First and second two-stage object detectors 660 and 680 may be conceptually similar to two-stage object detector 600 described with respect FIG. 6A but with the inclusion of fusion layers at various points on the object detector architecture.

First and second two-stage object detectors 660 and 680 may each input respective captured images 602 and 622, which may be from different perspectives. First and second two-stage object detectors 660 and 680 may output respective class prediction scores 612, 632, and refined bounding boxes 614 and 634 for each perspective.

First and second two-stage object detectors 660 and 680 may include fusion layers at various locations in each object detection pipeline. According to one implementation, first and second two-stage object detectors 660 and 680 may include fusion layer 616 after first feature extraction units 604 and 624. According to another implementation, first and second two-stage object detectors 660 and 680 may include fusion layer 618 after second feature extraction units 610 and 630 or any combination thereof.

In general, fusion layer 616 and fusion layer 618 may operate in a manner similar to the fusion layers described with respect to FIGS. 2 and 3. More particularly, fusion layers 616 and 618 may take a first feature map from a first perspective and combine the feature map from the first perspective with a summarized value of a second feature map from a second perspective. Further, fusion layers 616 and 618 may take the second feature map from the second perspective and combine the feature map from the second perspective with a summarized value of the feature map from the first perspective.

Example implementations of fusion layers have been described. Additional detail with respect to training object detectors that include fusion layers as well as empirical results of using fusion layers versus object detectors that do not use fusion layers will now be described.

V. Training and Empirical Results

The results of using fusion layers in various object detectors will now be described. More specifically, the results of inserting fusion layers into the Faster R-CNN and FPN object detectors will be described. In these training examples, all object detector models were pre-trained on the COCO dataset[11]. The training process described herein used the Adam optimizer with an initial learning rate of 1e−4 and a decay of 0.95 every 2000 steps.

[11] Lin, T., Maire, M., Belongie, S. J., Bourdev, L. D., Girshick, R. B., Hays, J., Perona, P., Ramanan, D., Dollar, P., and Zitnick, C. L. Microsoft COCO: common objects in context. CoRR abs/1405.0312 (2014).

Additionally, the training dataset was augmented with random flips. Since the top and side perspective images are horizontally aligned, horizontal flips were only performed for pairs of images. Vertical flips were chosen independently for the two perspectives. Further, the training uses a batch size of 12 scans (24 paired images), and training converges by 150,000 steps. The results of executing the trained model will now be described in greater detail.

To summarize the results, each of the architectures, the object detector models with fusion outperform the models without fusion. However, all of the models with different ways of fusion performed almost the same, implying the exact placement of fusion and the complexity of the fusion may have much effect on object detection accuracy.

The improvement with fusion did not differ significantly by class. For example, detection of handguns was the same with and without fusion. Detection of sharps increased by 1.2 points in the FPN model and by 2.0 points in the Faster R-CNN model. Table 1 summarizes the results of various architectures in terms of mAP (mean average precision) with and without fusion layers, and with or without various layers (e.g., F, G, H, K).

TABLE 1

Performance of Various Fusion Layer Implementations

| Experiment | Fusion Layer Configuration | mAP |
| --- | --- | --- |
| Faster R-CNN | Without Fusion | 86.0 |
|  | With Fusion | 90.7 |
| FPN (RetinaNet) | Without Fusion | 85.3 |
|  | Fusion During FPN | 89.7 |
|  | Fusion after FPN | 90.6 |
|  | Fusion after FPN, 3 layers for F, G H | 89.5 |
|  | Fusion after FPN, residual layer for K | 90.6 |
|  | Fusion after FPN, residual layer for F, G | 90.4 |
|  | Fusion during FPN and after FPN | 91.3 |

Figure 7:
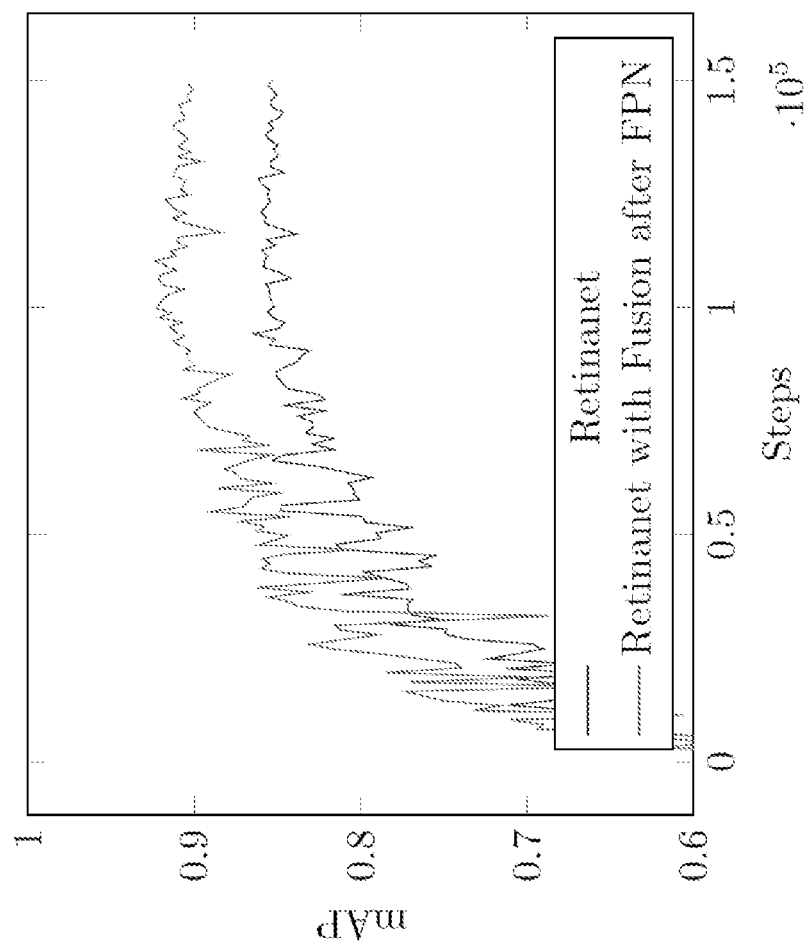
FIG. 7 is a graph illustrating the performance of using various configurations of fusion layers in various types of object detectors.

Turning now to FIG. 7, FIG. 7 is a graph illustrating the performance of RetinaNet (FPN) with a fusion layer versus RetinaNet without a fusion layer after the FPN feature extractor and on the validation dataset (i.e., COCO). As illustrated in FIG. 7, RetinaNet (FPN) with fusion after FPN (illustrated in red) outperforms RetinaNet.

Figure 8A:
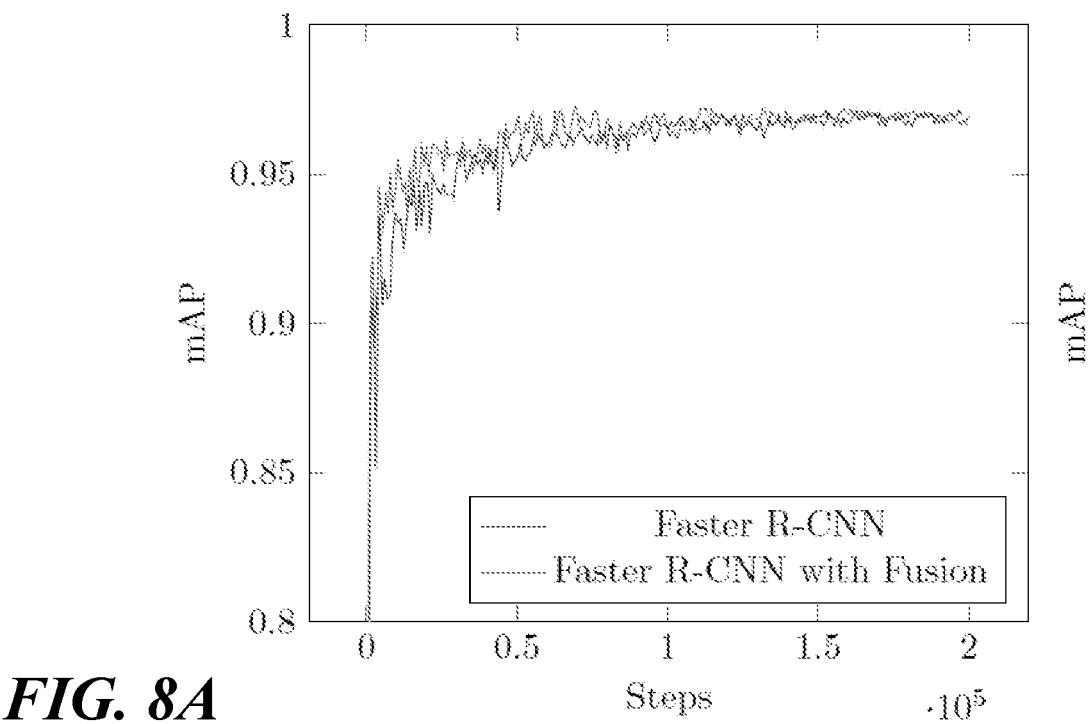
FIG. 8A is a graph illustrating the performance of the Faster R-CNN object detector without fusion layers versus using the Faster R-CNN object detector with fusion layers to perform object detection on a dataset of handguns.

Turning now to FIG. 8A, FIG. 8A is a graph illustrating the performance of Faster R-CNN without fusion layers versus Faster R-CNN with fusion layers on a dataset of handguns. As illustrated in FIG. 8A, Faster R-CNN with fusion layers (illustrated in red) outperforms Faster R-CNN on the handguns dataset.

Figure 8B:
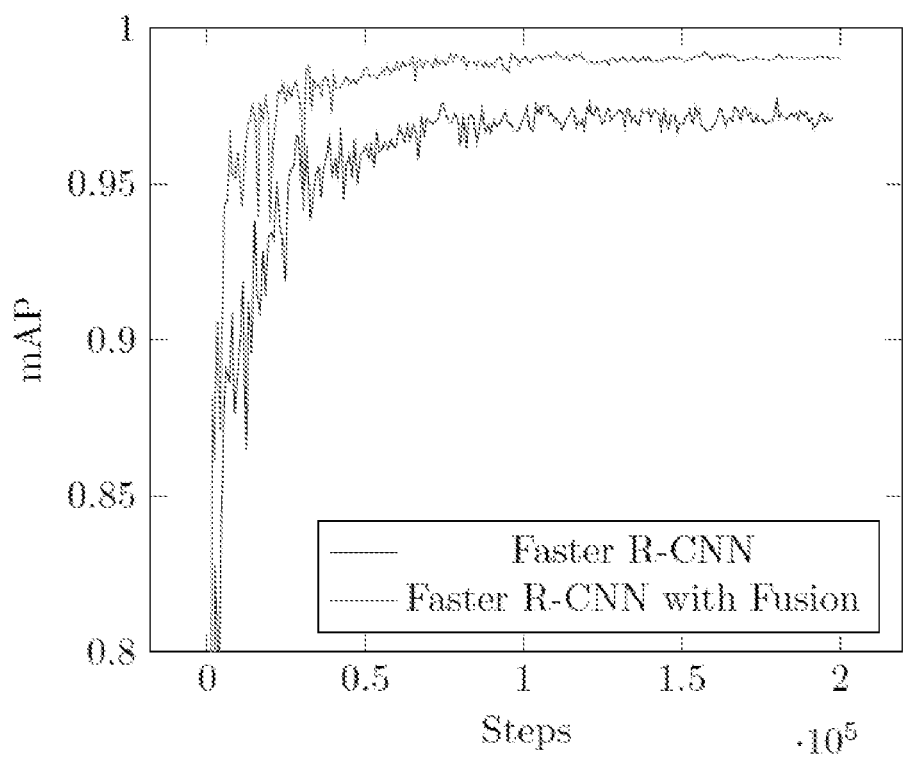
FIG. 8B is a graph illustrating the performance of the Faster R-CNN object detector without fusion layers versus using the Faster R-CNN object detector with fusion layers to perform object detection on a dataset of sharps.

Turning now to FIG. 8B, FIG. 8B is a graph illustrating the performance of Faster R-CNN versus Faster R-CNN with fusion on a dataset of sharps (e.g., knives, blades, and the like). As illustrated in FIG. 8A, Faster R-CNN with Fusion outperforms Faster R-CNN. On the sharps dataset.

VI. Example Operations for Object Fusion

Figure 9:
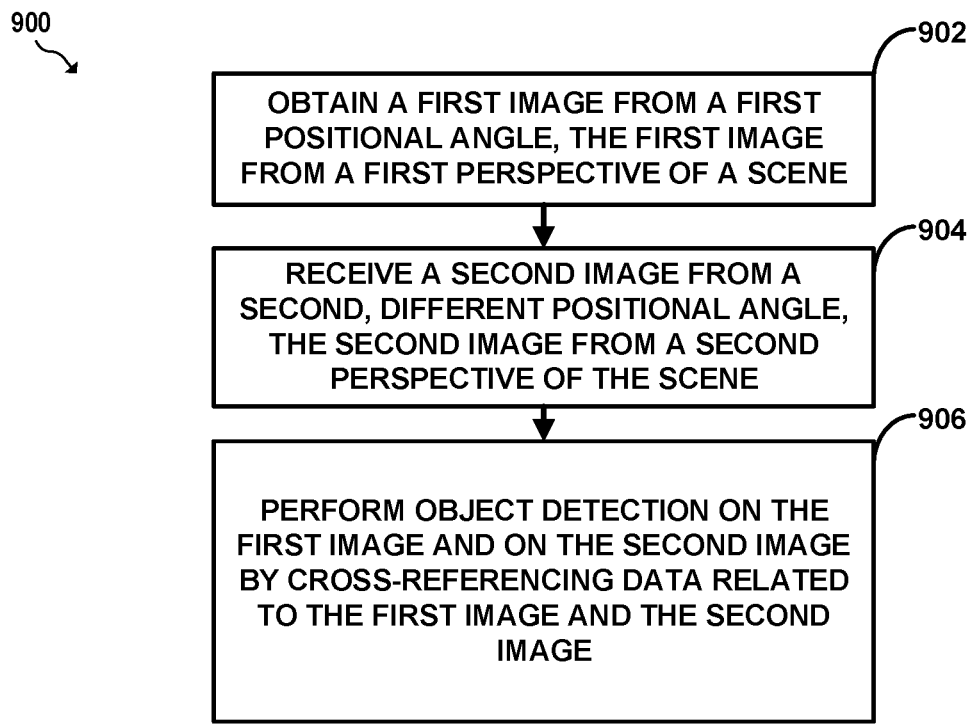
FIG. 9 is a flow diagram illustrating example operations for performing perspective fusion with an object detector that utilizes one or more fusion layers in accordance with this disclosure.

FIG. 9 is a flow diagram illustrating example operations for classifying an item from a captured image. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein is a computer system that is configured to generate graphical output related to objects identified based on image data. For purposes of illustration, the example functions are described below as being carried out by computer system 100 of FIG. 1 and/or any of the object detectors described herein, but it should be understood that various other devices, systems, object detector architectures and/or platforms may perform the example functions described with respect to FIG. 9.

It should be understood that any of the components and/or architectures (e.g., neural network architectures) illustrated in FIGS. 1-6B may perform the functions described with respect to FIG. 9. Additionally, it should be understood that some or all of the blocks illustrated in FIG. 9 may be performed, in any order, and/or there may be additional blocks or fewer blocks as well.

Method 900 begins at block 902. At block 902, an object detector that may be executed by a processor such as processor 102 and/or GPU 104, may receive, with an object detector, a first image from a first positional angle, wherein the first image is from a first perspective of a scene.

At block 904, processor 102 and/or GPU 102 may receive, with the object detector, a second image from a second, different positional angles, wherein the second image is from a second perspective of the scene.

At block 906, a neural network, which may be executed processor 102 and/or GPU 102, may perform object detection on the image from the first perspective and the second image from the second perspective by cross-referencing data related to the first image and the second image between the first and second perspectives with the object detector.

It should be understood that the steps performed in FIG. 9 may be performed by software, hardware, firmware, ASICs, FPGAs, including processors, GPUs, or any combination thereof. Such steps may be implemented in the form of software instructions, which may be stored on a non-transitory computer-readable storage medium and/or on a computing system, which may include a memory, one or more processors, a network interface, various hardware and/or software neural networks, etc.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

The invention claimed is:

1. A computing system comprising:
    at least one first neural network configured to accept data indicative of a first visual input that is representative of a first perspective of a scene;
    at least one second neural network configured to accept data indicative of a second visual input that is representative of a second perspective of the scene that differs from the first perspective of the scene, wherein the first perspective and the second perspective share a common dimension;
    at least one processor;
    a non-transitory computer-readable medium;
    program instructions that are stored on the non-transitory computer-readable medium that are executable by the at least one processor such that the computing system is configured to:
    generate (i) a first feature map based on the data indicative of the first visual input utilizing the at least one first neural network and (ii) a second feature map based on the data indicative of the second visual input utilizing the at least one second neural network;
    based on at least a portion of the first feature map and at least a portion of the second feature map, generate one or more fused feature maps that cross-reference features in the scene from the first perspective and the second perspective; and
    based on the one or more fused feature maps, perform object detection on the scene.

2. The computing system of claim 1, wherein the scene comprises a three-dimensional space where one or more of luggage or storage receptacles are scanned, wherein the first visual input comprises at least one first image of the three-dimensional space from the first perspective, and wherein the second visual input comprises at least one second image of the three-dimensional space from the second perspective.

3. The computing system of claim 1, wherein the first perspective comprises a first series of one or more slices corresponding to a first depth of the scene, and wherein the second perspective comprises a second series of one or more slices corresponding to a second depth of the scene.

4. The computing system of claim 1, wherein the computing system is configured to perform object detection on the scene by using either (i) a single-stage object detector or (ii) a two-stage object detector.

5. The computing system of claim 1, wherein the at least one first neural network is part of a first object-detection pipeline and the at least one second neural network is part of a second object-detection pipeline, and wherein the first and second object-detection pipelines are each coupled to at least one fusion layer that is configured to generate the one or more fused feature maps.

6. The computing system of claim 1, wherein the common dimension is a first common dimension, wherein the first perspective shares a second common dimension with a third perspective, and wherein the program instructions are further executable by the at least one processor such that the computing system is configured to: generate a third feature map based on data indicative of a third visual input that is representative of the third perspective.

7. The computing system of claim 6, wherein the program instructions are further executable by the at least one processor such that the computing system is configured to generate the one or more fused feature maps based on (i) the first feature map and the portion of the second feature map corresponding to the first common dimension and (ii) the first feature map and a portion of the third feature map corresponding to the second common dimension.

8. The computing system of claim 1, wherein the program instructions are further that are executable by the at least one processor such that the computing system is configured to make a determination that at least one of the first visual input or the second visual input comprises an object of interest and based on (i) the determination and (ii) one or more security parameters, determine that a security interest has been detected at the scene.

9. A non-transitory computer-readable medium comprising program instructions stored thereon that are executable by at least one processor such that a computing system is configured to:
generate (i) a first feature map based on a first visual input that is representative of a first perspective of a scene utilizing at least one first neural network configured to accept data indicative of the first visual input and (ii) a second feature map based on a second visual input that is representative of a second perspective of the scene that differs from the first perspective of the scene utilizing at least one second neural network configured to accept data indicative of the second visual input, wherein the first perspective and the second perspective share a common dimension;
based on at least a portion of the first feature map and at least a portion of the second feature map, generate one or more fused feature maps that cross-reference features in the scene from the first perspective and the second perspective and
based on the one or more fused feature maps, perform object detection on the scene.

10. The non-transitory computer-readable medium of claim 9, wherein the scene comprises a three-dimensional space where one or more of luggage or storage receptacles are scanned, wherein the first visual input comprises a first image of the three-dimensional space from the first perspective, and wherein the second visual input comprises a second image of the three-dimensional space from the second perspective.

11. The non-transitory computer-readable medium of claim 9, wherein the first perspective comprises a first series of one or more slices corresponding to a first depth of the scene, and wherein the second perspective comprises a second series of one or more slices corresponding to a second depth of the scene.

12. The non-transitory computer-readable medium of claim 9, wherein the program instructions that are executable by the at least one processor such that the computing system is configured to perform object detection on the scene by using either (i) a single-stage object detector or (ii) a two-stage object detector.

13. The non-transitory computer-readable medium of claim 9, wherein the at least one first neural network is part of a first object-detection pipeline and the at least one second neural network is part of a second object-detection pipeline, and wherein the first and second object-detection pipelines are each coupled to at least one fusion layer that is configured to generate the one or more fused feature maps.

14. The non-transitory computer-readable medium of claim 9, wherein the common dimension is a first common dimension, wherein the first perspective shares a second common dimension with a third perspective, and wherein the program instructions are further executable by the at least one processor such that the computing system is configured to: generate a third feature map based on data indicative of a third visual input that is representative of the third perspective.

15. The non-transitory computer-readable medium of claim 14, wherein the program instructions are further executable by the at least one processor such that the computing system is configured to generate the one or more fused feature maps based on (i) the first feature map and the portion of the second feature map corresponding to the first common dimension and (ii) the first feature map and a portion of the third feature map corresponding to the second common dimension.

16. The non-transitory computer-readable medium of claim 9, wherein the program instructions are further executable by the at least one processor such that the computing system is configured to make a determination that at least one of the first visual input or the second visual input comprises an object of interest and based on (i) the determination and (ii) one or more security parameters, determine that a security interest has been detected at the scene.

17. A non-transitory computer-implemented method comprising:
generating (i) a first feature map based on data indicative of a first visual input that is representative of a first perspective of a scene utilizing at least one first neural network configured to accept the data indicative of the first visual input and (ii) a second feature map based on data indicative of a second visual input that is representative of a second perspective of the scene that differs from the first perspective of the scene utilizing at least one second neural network configured to accept the data indicative of the second visual input, wherein the first perspective and the second perspective share a common dimension;
based on the first feature map and a portion of the second feature map corresponding to the common dimension, generating one or more fused feature maps that cross-reference features in the scene from the first perspective and the second perspective; and based on the one or more fused feature maps, performing object detection on the scene.

18. The non-transitory computer-implemented method of claim 17, wherein the scene comprises a three-dimensional space where one or more of luggage or storage receptacles are scanned, wherein the data indicative of the first visual input comprises a first image of the three-dimensional space from the first perspective, and wherein the data indicative of the second visual input comprises a second image of the three-dimensional space from the second perspective.

19. The non-transitory computer-implemented method of claim 17, wherein the first perspective comprises a first series of one or more slices corresponding to a first depth of the scene, and wherein the second perspective comprises a second series of one or more slices corresponding to a second depth of the scene.

20. The non-transitory computer-implemented method of claim 17, wherein performing object detection on the scene comprises: based on the one or more fused feature maps for the first visual input and for the second visual input, making a determination that at least one of the first visual input or the second visual input comprises an object of interest; and based on (i) the determination and (ii) one or more security parameters, determining that a security interest has been detected at the scene.

* * * * *